Patented Oct. 28, 1924.

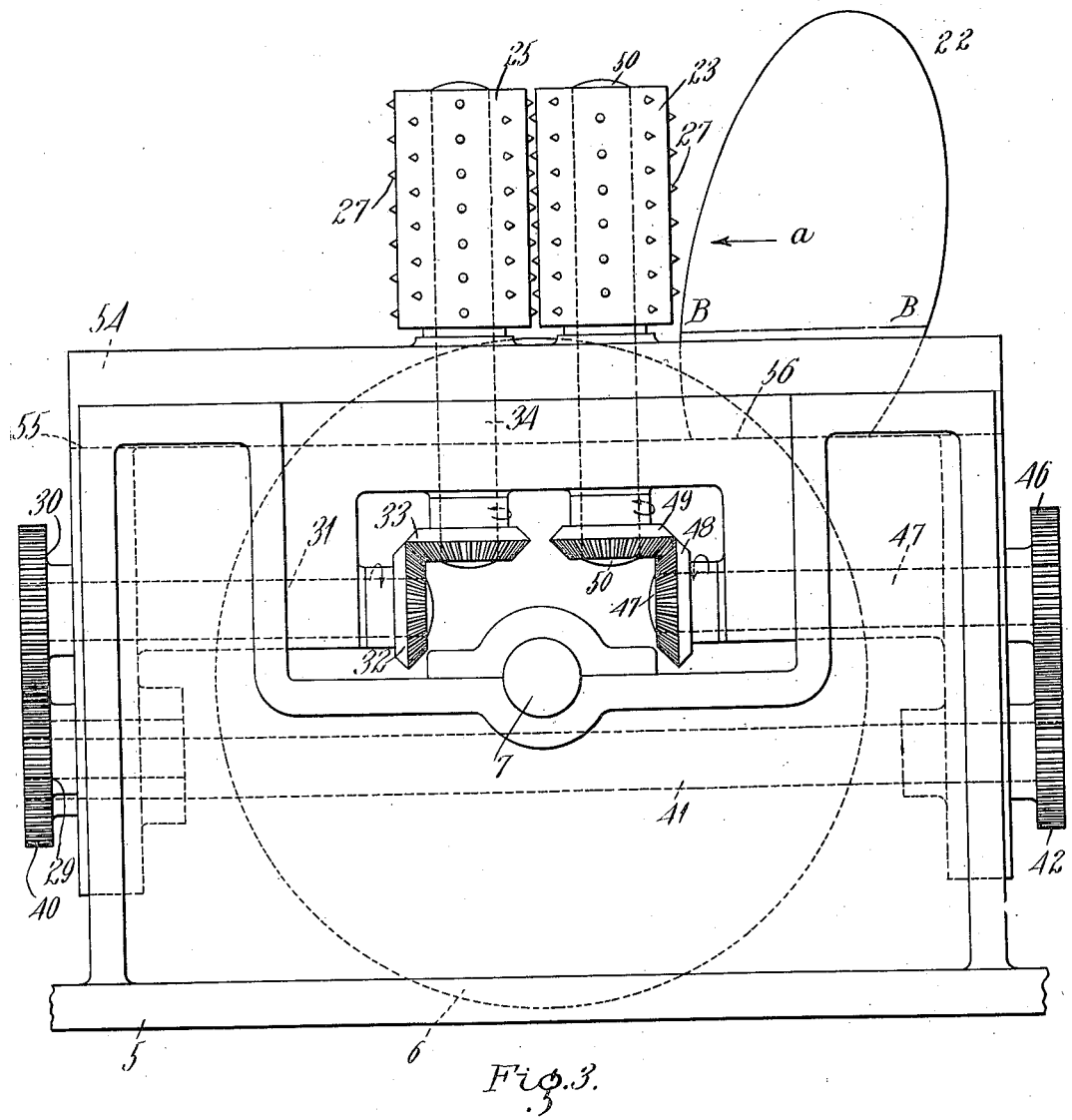

1,513,376

UNITED STATES PATENT OFFICE.

JOHN F. DONNELLY AND ERNEST S. JOHNSON, OF BROCKTON, MASSACHUSETTS, ASSIGNORS, BY MESNE ASSIGNMENTS, TO PANCO RUBBER COMPANY, OF CHELSEA, MASSACHUSETTS, A CORPORATION OF MASSACHUSETTS.

TAP-SPLITTING MACHINE.

Application filed June 29, 1923. Serial No. 648,518.

*To all whom it may concern:*

Be it known that we, JOHN F. DONNELLY and ERNEST S. JOHNSON, citizens of the United States, residing at Brockton, in the county of Plymouth and State of Massachusetts, have invented new and useful Improvements in Tap-Splitting Machines, of which the following is a specification.

This invention relates to a machine for splitting the taps of boots and shoes for a portion of their length from the rear edge thereof.

Certain styles of taps for boots and shoes made of rubber or composition are now being split for a portion of their length from the rear end thereof and a tape inserted between the split portions of the tap so that when the tap is affixed to a shoe by means of nails, or other fastening means, the nails will not pull out of the tap when the shoe is in use.

The object of this invention, therefore, is to accurately and speedily split the taps of boots or shoes to a certain depth of cut from the straight rear edge thereof.

The invention consists in the combination and arrangement of parts set forth in the following specification and particularly pointed out in the claims thereof.

Referring to the drawings:—

Fig. 3 is a side elevation as viewed from the right of Fig. 2.

Like numerals refer to like parts throughout the several views of the drawings.

Figures 1, 2:
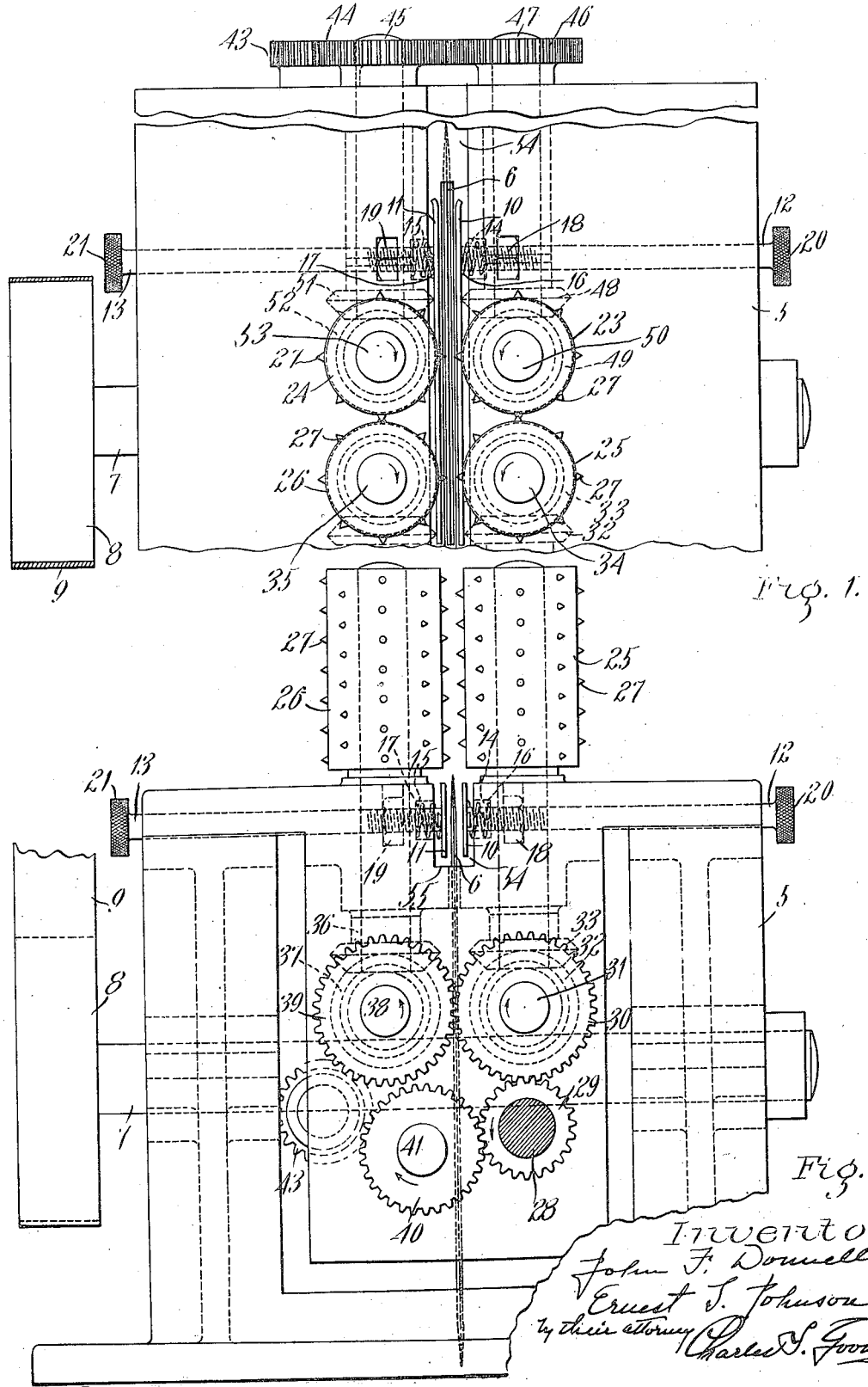
Figure 1 is a plan view of a machine embodying our invention, the same being broken away to save space.
Fig. 2 is a rear elevation of the same, also broken away.

In the drawings, 5 is the frame of the machine. 6 is a cutter for splitting the taps. 7 is a shaft to which the cutter 6 is fastened, rotary motion being imparted thereto by a pulley 8 and belt 9. Upon opposite sides of the cutter 6 are two guide plates 10 and 11 which are fast to rods 12 and 13 slidably mounted in the frame of the machine.

The frame of the machine is recessed at 14 and 15 to receive spiral springs 16 and 17 which encircle the shafts 12 and 13 and bear against the plates 10 and 11 respectively, tending to force them toward the cutter 6. The distance to which they can be moved toward the cutter is regulated by nuts 18 and 19 having screw-threaded engagement with the rods 12 and 13 respectively. By rotating the rods 12 and 13 by means of the heads 20 and 21 respectively, the guide plates 10 and 11 may be adjusted toward or away from the cutter 6.

It will be understood that the nuts 18 and 19 act as stops which abut against the frame and limit the distance to which the plates 10 and 11 can be moved toward each other by the springs 16 and 17.

A tap 22 is fed to the cutter by a series of pairs of feed rolls, 23 and 24 being one of said pairs of rolls and 25 and 26 constituting the other of said pairs of rolls.

The number of pairs of rolls may be increased as may be desired, but in the present embodiment of our invention we have illustrated two pairs. The rolls 23, 24, 25 and 26 constitute, therefore, feed rolls for the tap and in order to feed the tap with accuracy and speed and in order to be sure that it does not slip while being so fed, the feed rolls are preferably provided with prongs 27 which project into the tap on opposite sides thereof and thus insure the tap being fed at set forth.

A rotary motion is imparted to the feed rolls in the respective directions of the arrows thereon by a shaft 28 which is rotated by a pulley, not shown in the drawings. To the shaft 28 is fastened a gear 29 which meshes into a gear 30 fast to a shaft 31 which is rotatably mounted in the frame of the machine and has affixed to its opposite end a bevel gear 32 which meshes into a bevel gear 33 fast to a vertical shaft 34, to the upper end of which is fastened the feed roll 25.

The feed roll 26 is fast to a shaft 35, to the lower end of which is fastened a bevel gear 36 driven by a bevel gear 37 which is fastened to a shaft 38 and said shaft 38 has fastened to its opposite end a spur gear 39 which meshes into a spur gear 30 and thus the rolls 25 and 26 are driven in the respective directions indicated by the arrows thereon.

The rolls 23 and 24 are driven by a gear 40 which meshes into the gear 29 and is fastened to a shaft 41, to the other end of which is fastened a gear 42 which meshes into a gear 43, which in turn meshes into a gear 44 fast to a shaft 45, and the gear 44 meshes into a gear 46 fast to a shaft 47. The shaft 47 has a bevel gear 48 fastened to its opposite end which meshes into a gear 49 fast to a vertical shaft 50, to the upper end of which is fastened the feed roll 23. The shaft 45 has a bevel gear 51 fast to its opposite end which meshes into a bevel gear 52 fast to the lower end of a shaft 53, to the upper end of which is fastened the roll 24.

The frame of the machine is provided with a recessed portion 54, the bottom surface 55 of which constitutes a gauge against which the straight rear edge 56 of the tap 22 rests as it is being fed forward by the feed rolls to the cutter.

The general operation of the mechanism hereinbefore specifically described is as follows:—A tap 22 is placed in the machine in the position illustrated in Fig. 3 with a straight rear edge 56 thereof resting against the gauge surface 55. It is then pushed by the operator in the direction of the arrow a, Fig. 3, between the rolls 23 and 24 which immediately grip it and carry it forward between the guide plates 10 and 11 and into engagement with the upper portion of the cutter 6. The rolls 23 and 24 feed the tap forward until it is engaged by the rolls 25 and 26 and these rolls complete the feeding operation of the tap which is split by the cutter 6 during this feeding operation from the straight rear edge 56 thereof to the depth of cut illustrated by the broken line B—B, Fig. 3. As soon as the tap passes out from between the rolls 25 and 26 it is removed from the machine by the operator.

We claim:

1. A tap splitting machine having, in combination, a frame having a recess, one surface of which constitutes a guide for the rear edge of the tap, a rotary cutter extending into the recess and adapted to split the tap to a depth of cut less than the length of the tap, and means for guiding the tap relatively to the cutter in a plane parallel to the face of the cutter.

2. A tap splitting machine having, in combination, a frame having a recess the bottom surface of which constitutes a guide for the rear edge of the tap, a plurality of feed rolls for moving the tap through the recess, a rotary cutter extending into the recess with its face parallel to the path of motion of the tap and adapted to cut the tap to a depth less than the length of the tap, and means for guiding the tap laterally while being fed to the cutter.

3. A tap splitting machine having, in combination, a rotary cutter, means to feed a tap to said cutter and means to guide said tap relatively to said cutter in a plane approximately parallel to the face of said cutter and comprising a pair of oppositely disposed guide plates located upon opposite sides respectively of said cutter.

4. A tap splitting machine having, in combination, a rotary cutter, means to feed a tap to said cutter and means to guide said tap relatively to said cutter in a plane approximately parallel to the face of said cutter and comprising a pair of oppositely disposed spring-actuated guide plates located upon opposite sides respectively of said cutter and adapted to bear against the opposite faces of said tap as it is being operated upon by said cutter.

5. A tap splitting machine having, in combination, a rotary cutter, means to feed a tap to said cutter and means to guide said tap relatively to said cutter in a plane approximately parallel to the face of said cutter and to a depth of cut less than the length of said tap, said guiding means comprising a pair of oppositely disposed plates located upon opposite sides respectively of said cutter and adapted to engage the opposite faces of said tap as it is being split and a gauge against which the rear edge of said tap is adapted to bear while being fed to the cutter.

6. A tap splitting machine having, in combination, a rotary cutter, a series of pairs of feed rolls adapted to feed a tap to said cutter, the axes of said rolls lying in two parallel planes extending transversely of the axis of said cutter and upon opposite sides respectively of said cutter and means to guide said tap relatively to said cutter in a plane approximately parallel to the face of said cutter and to a depth of cut less than the length of said tap, said guiding means comprising a pair of oppositely disposed plates located upon opposite sides respectively of said cutter and adapted to engage opposite faces of said tap as it is being split and a gauge against which the rear edge of said tap is adapted to bear while being fed to the cutter.

In testimony whereof we have hereunto set our hands in presence of two subscribing witnesses.

JOHN F. DONNELLY.
ERNEST S. JOHNSON.

Witnesses:
FRANKLIN E. LOW,
CHARLES S. GOODING.